United States Patent [19]

Miya et al.

[11] Patent Number: 4,844,430
[45] Date of Patent: Jul. 4, 1989

[54] FLUID-FILLED ELASTIC CUSHIONING DEVICE HAVING STOPPER BLOCK FOR CLOSING ORIFICE UPON EXCESSIVE LOAD APPLICATION

[75] Inventors: Yasuhiro Miya, Kakogawa; Kouji Sawada; Masato Tanabe, both of Toyota; Hitoshi Araki, Aichi; Takanobu Nanno, Kasugai, all of Japan

[73] Assignees: Tokai Rubber Industries, Ltd., Aichi, Japan; Toyota Jidosha Kabushiki Kaisha

[21] Appl. No.: 240,519

[22] Filed: Sep. 6, 1988

[30] Foreign Application Priority Data

Sep. 8, 1987 [JP] Japan .............................. 62-137119[U]
Jun. 2, 1988 [JP] Japan .............................. 63-73534[U]

[51] Int. Cl.$^4$ .............................................. F16F 13/00
[52] U.S. Cl. ................................. 267/140.1; 180/312; 180/902; 248/562; 248/636; 267/140.3; 267/141.2; 267/219
[58] Field of Search ................ 267/219, 220, 140.1, 267/153, 152, 140, 140.3, 140.4, 141, 141.2, 141.3, 141.4; 248/562, 636; 180/300, 312, 902; 267/292, 293, 294

[56] References Cited

U.S. PATENT DOCUMENTS

| | | | |
|---|---|---|---|
| 4,383,679 | 5/1983 | Kakimoto | 248/562 X |
| 4,416,445 | 11/1983 | Coad | 248/562 X |
| 4,588,174 | 5/1986 | Konishi | 267/141.2 X |
| 4,618,129 | 10/1986 | Bechu | 267/140.1 |
| 4,700,934 | 10/1987 | Andrä et al. | 267/141.2 X |
| 4,717,111 | 1/1988 | Saito | 267/140.1 X |
| 4,721,291 | 1/1988 | Makibayashi et al. | 267/140.1 |
| 4,739,979 | 4/1988 | Kanda | 248/562 X |
| 4,741,521 | 5/1988 | Schiffner et al. | 248/562 X |
| 4,749,173 | 6/1988 | Kanda | 180/312 X |
| 4,757,982 | 7/1988 | Andrä et al. | 267/219 |
| 4,781,361 | 11/1988 | Makibayashi et al. | 267/140.1 |
| 4,790,520 | 12/1988 | Tanaka et al. | 267/141.2 X |
| 4,795,140 | 1/1989 | Orikawa et al. | 248/636 X |

FOREIGN PATENT DOCUMENTS

| | | | |
|---|---|---|---|
| 3540205 | 5/1987 | Fed. Rep. of Germany | 180/300 |
| 3722079 | 1/1988 | Fed. Rep. of Germany | 248/562 |
| 3641006 | 6/1988 | Fed. Rep. of Germany | 180/312 |
| 0149436 | 11/1980 | Japan | 267/140.1 |
| 103044 | 6/1984 | Japan | 248/636 |
| 139507 | 7/1985 | Japan | 248/562 |
| 0157539 | 8/1985 | Japan | 267/219 |
| 0245848 | 12/1985 | Japan | 267/140.1 |
| 59034 | 3/1986 | Japan | 267/219 |
| 0165040 | 7/1986 | Japan | 248/636 |

*Primary Examiner*—Douglas C. Butler
*Attorney, Agent, or Firm*—Oliff & Berridge

[57] ABSTRACT

A fluid-filled elastic cushioning device for elastically connecting a first and a second member, including an inner sleeve attached to the first member, an elastic body fitted on the inner sleeve and having two pockets which are open in opposite axial end faces of the elastic body, two closure members for closing the open ends of the pockets to thereby form two fluid chambers, an orifice member embedded in the elastic body and having an orifice communicating with the fluid chambers, and a mounting plate secured to the orifice member. At least one of opposite ends of the orifice is open at a bottom of the corresponding at least one of the pockets, and at least one stopper rubber block is secured to each of at least one of the closure members which closes the corresponding at least one of the pockets. Each rubber block extends into the corresponding one of the fluid chambers such that a free end of each rubber block is normally spaced apart from the corresponding open end of the orifice. Each rubber block is abuttable at the free end thereof on the corresponding end of the orifice member, to thereby close the orifice at the corresponding open end, when the cushioning device is subjected to an excessive vibrational load.

10 Claims, 3 Drawing Sheets

FLUID-FILLED ELASTIC CUSHIONING DEVICE HAVING STOPPER BLOCK FOR CLOSING ORIFICE UPON EXCESSIVE LOAD APPLICATION

BACKGROUND OF THE INVENTION

1. Field of the Invention

The present invention relates to a fluid-filled elastic cushioning device used on a motor vehicle, for example, for elastically connecting a shaft or rod member to a support structure, such that the cushioning device damps or isolates input vibrations applied thereto in its axial direction, in particular.

2. Discussion of the Prior Art

As a cushioning device used for a suspension system of a motor vehicle, there is known a device which elastically or flexibly connects a shaft or rod to a support structure, in such a manner as to damp or isolate primarily the vibrations applied in the axial direction of the device. For example, such a cushioning device is used as a body mount, cab mount, or a member mount or a strut bar cushion of the motor vehicle.

To improve the vibration damping and/or isolating capability of such a cushioning device, there have been recently proposed various types of fluid-filled elastic cushions or mounts, wherein an elastic body has a plurality of fluid chambers which are filled with a non-compressible fluid and which communicate with each other through an orifice passage or passages. The vibrations applied to the cushion or mount are damped due to a flow resistance of the fluid through the orifice passages, or based on resonance of the fluid masses in the passages.

The known types of fluid-filled elastic cushions or mounts exhibit a linear load-strain relationship. Namely, the spring characteristic of the cushions or mounts are such that the amount of elastic deformation of the elastic body is changed in substantially linear relationship with the magnitude of the input vibrational load. In the known fluid-filled elastic cushioning devices, no provisions are made for giving a non-linear load-strain spring characteristic.

In the fluid-filled elastic cushioning devices of the known types, the elastic body should have a relatively high degree of stiffness or hard spring characteristic, in order to resist an input vibrational load having a large amplitude, or to avoid an excessive amount of elastic deformation of the elastic body. The relatively high stiffness of the elastic body means a relatively small amount of change in the volumes of the fluid chambers upon application of vibrations of ordinary amplitudes, i.e., a relatively small amount of flow of the fluid through the orifice passage or passages between the fluid chambers. Consequently, the relatively stiff or hard elastic body of the cushioning device results in insufficient vibration damping and/or isolating capability based on the fluid flow resistance or resonance of the fluid masses.

Where the known fluid-filled elastic cushioning device is utilized as a strut bar cushion in a suspension system of an automotive vehicle, the elastic body should exhibit comparatively stiff spring characteristic, in order to reliably deal with a high vibrational load. However, this stiff spring characteristic is undesirable for dealing with harshness shocks which may occur during running of the vehicle on a stepped road surface, because of the reduced vibration damping effect based on the fluid flows through the orifice passages. Hence, the known fluid-filled elastic cushioning devices fail to assure satisfactory driving comfort of the vehicle.

SUMMARY OF THE INVENTION

It is therefore an object of the present invention to provide a fluid-filled elastic cushioning device which exhibits a non-linear load-strain relationship, that is, relatively soft spring characteristic based on the fluid flows through an orifice when the device is exposed or subjected to an ordinary amount of vibrational load, and relatively hard or stiff spring characteristic for reliably dealing with a considerably high vibrational load, without an excessive amount of elastic deformation of the elastic body.

The above object may be achieved according to the principle of the present invention, which provides a fluid-filled elastic cushioning device for elastically connecting a first and a second member, comprising: an inner sleeve through which the first member is fixedly inserted; an elastic body fitted on an outer circumferential surface of the inner sleeve and having a first and a second pocket which are spaced apart from each other in an axial direction of the inner sleeve and which are open in opposite axial end faces of the elastic body; a first and a second closure member for fluid-tightly closing the open ends of the first and second pockets to thereby form a first and a second fluid chamber filled with a non-compressible fluid; an orifice-defining member embedded in the elastic body and having an orifice which communicates with the first and second fluid chambers; and a mounting plate secured to an outer circumferential surface of the orifice-defining member such that the mounting plate extends through an axially intermediate portion of the elastic body in a radial direction of the inner sleeve. At least one of opposite ends of the orifice which communicate with the first and second fluid chambers is open at a bottom of the corresponding at least one of the first and second pockets. At least one stopper rubber block is secured to each of at least one of the first and second closure members which closes the above-indicated corresponding at least one of the first and second pockets. Each stopper rubber block extends into the corresponding fluid chamber such that a free end of the stopper rubber block is normally spaced apart by a predetermined distance from the corresponding open end of the orifice. Each stopper rubber block is abuttable at the free end thereof on the corresponding end of the orifice-defining member, to thereby close the orifice at the corresponding open end, when the cushioning device is subjected to a vibrational load exceeding a predetermined upper limit.

In the fluid-filled elastic cushioning device of the present invention constructed as described above, each stopper rubber block is brought into abutting contact with the end face of the orifice-defining member, and thereby closes the corresponding open end of the orifice, when an excessively high vibrational load is applied to the device. In this case, the cushioning device exhibits relatively hard or stiff spring characteristic, being capable of reliably dealing with the input vibrations having a considerably large amplitude, without an excessive amount of elastic deformation of the elastic body. On the other hand, the fluid may flow through the open orifice between the two fluid chambers when the input vibrational load is lower than the predetermined upper limit. In this case, the cushioning device exhibits relatively soft spring characteristic, being capable of effectively damping the input vibrations having an ordinary amplitude, based on the fluid flows through the orifice. Thus, the instant fluid-filled elastic cushioning device exhibits a non-linear load-strain relationship.

In one form of the present invention, at least one of the above-indicated at least one rubber block is formed with at least one insert which extends from its free end, so as to move in opposite directions in an end portion of the orifice through the corresponding open end of the orifice as the cushioning device is subjected to the vibrational load. An outer surface of each insert or an inner surface of the end portion of the orifice is tapered such that an amount of a clearance between the outer surface of each insert and the inner surface of the end portion of the orifice is varied as each insert is moved in the end portion of the orifice. Since the cross sectional area of the fluid flows at the relevant open end of the orifice is changed as the insert is moved in the end portion of the orifice, the stiffness of the device is gradually changed with the magnitude of the input vibrational load. Consequently, the instant cushioning device does not suffer from a sudden change in its spring characteristic or stiffness upon abutment of the stopper rubber block or blocks on the end face of the orifice-defining member, or upon closure of the open end of the orifice by the stopper rubber block or blocks. Each stopper rubber block may have an internally positioned stiff portion which has a higher hardness than the remainder of the stopper rubber block. The insert may be formed as an integral part of the stiff block such that the insert extends from the stiff portion into the end portion of the orifice, through the remainder of the rubber block.

In another form of the invention, the orifice-defining member consists of an annular member which has two fluid passages formed in an axial direction thereof. The two fluid passages are spaced apart from each other in a circumferential direction of the annular member. In this case, the above-indicated at least one stopper rubber block consists of two rubber blocks which are abuttable on the open ends of the two fluid passages, respectively.

In a further form of the invention, the opposite ends of the orifice are open in the bottoms of the first and second pockets, respectively, and the above-indicated at least one stopper rubber block is disposed in one of the first and second fluid chambers. Alternatively, the at least one stopper rubber block is disposed in both of the first and second fluid chambers.

In a yet further form of the invention, the cushioning device further comprises at least one binding ring associated with the elastic body, for limiting an amount of elastic deformation of the elastic body in a radially outward direction of the inner sleeve.

The first and second fluid chambers may be a pair of annular chambers which normally communicate with each other through the orifice formed in the orifice-defining member embedded in an axially middle portion of the elastic body.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 8:
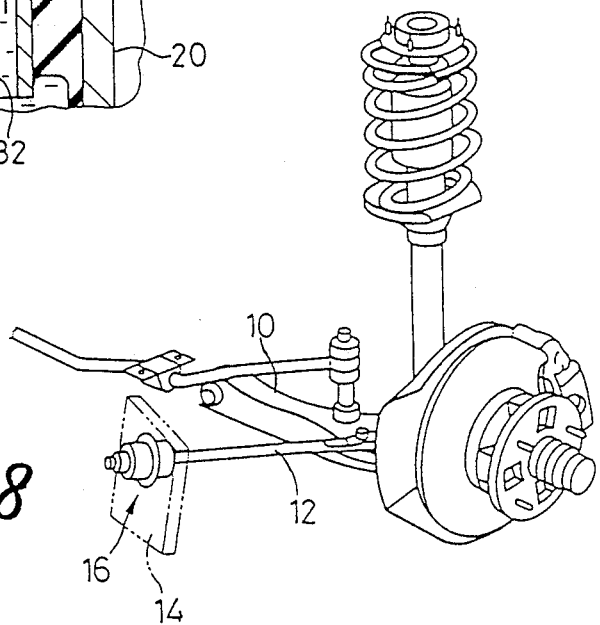
FIG. 8 is a perspective view illustrating a suspension system of a motor vehicle which uses the strut bar cushion as shown in FIGS. 1–7.

Referring to FIG. 8, there is indicated at 16 a fluid-filled elastic cushioning device embodying the present invention in the form of a strut bar cushion. The strut bar cushion 16 is used in a suspension system of a motor vehicle wherein a strut bar 12 is connected at its one end to a suspension arm 10. The strut bar cushion 16 elastically connects the strut bar 12 to a body 14 of the vehicle, such that the cushion 16 damps vibrations applied thereto in its axial direction, in particular.

Figure 1:
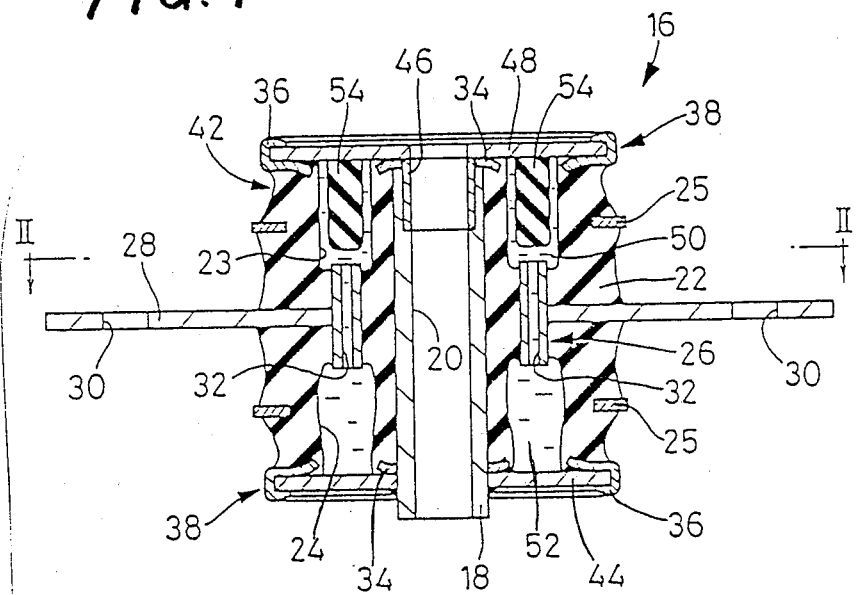
FIG. 1 is an elevational view in longitudinal cross section of one embodiment of a fluid-filled elastic cushioning device of the invention in the form of a strut bar cushion.
Figure 2:
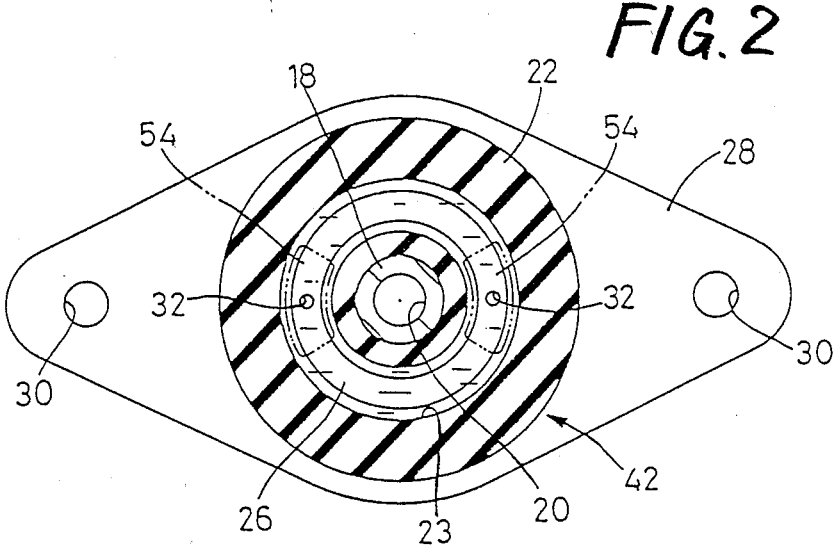
FIG. 2 is a cross sectional view taken along line II-II of FIG. 1.

The fluid-filled strut bar cushion 16 is constructed as shown in FIGS. 1 and 2, wherein reference numeral 18 designates a cylindrical inner metal sleeve which has an axial bore 20. The strut bar cushion 16 is attached to the strut bar 12 of the vehicle suspension system such that the strut bar 12 is fixedly inserted into the bore 20 of the inner sleeve 18.

Figure 3:
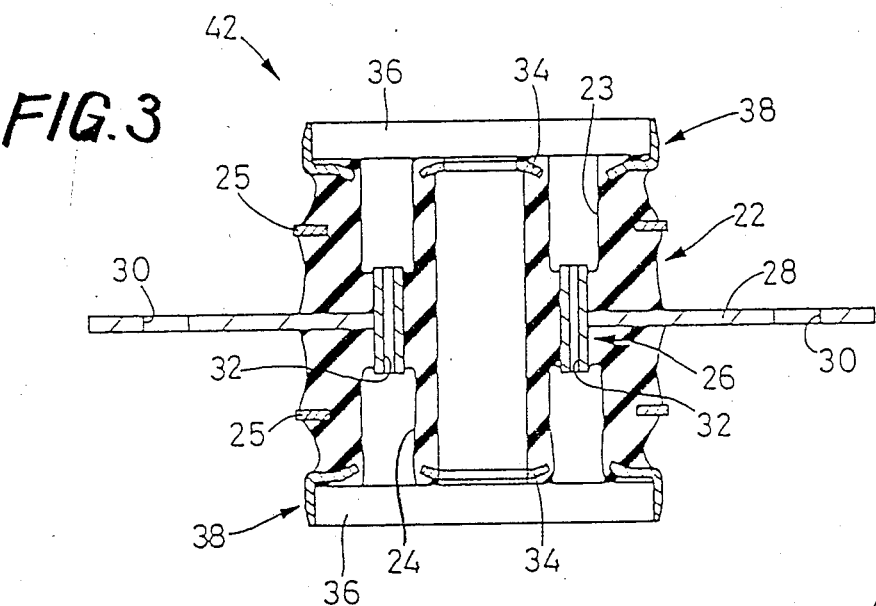
FIG. 3 is an elevational view in longitudinal cross section of an intermediate component prepared in the process of manufacture of the strut bar cushion of FIG. 1.

On the outer circumferential surface of the inner sleeve 18, there is fitted a generally substantially cylindrical elastic body in the form of a rubber body 22. As also shown in FIG. 3, a first and a second annular pocket 23, 24 are formed in opposite axial end portions of the rubber body 22 such that the annular pockets 23, 24 are open in the respective end faces of the rubber body 22. These first and second pockets 2, 24 have an axial length smaller than a half of the axial length of the rubber block 22, and are spaced apart from each other in their axial direction. The rubber body 22 has a pair of binding rings 25 substantially embedded in its outer circumferential portion. The binding rings 25 serve to limit an amount of elastic radial expansion of the rubber body 22.

During vulcanization of the rubber body 22, an orifice-defining annular metal member 26 having a diameter larger than the outside diameter of the inner sleeve 18 is embedded in an axially intermediate portion of the rubber body 22, in coaxial relation with the inner sleeve 18, such that the annular metal member 26 and the inner sleeve 18 are radially spaced apart from each other by a suitable distance. The opposite axial end faces of the annular metal member 26 are exposed to the bottoms of the respective first and second pockets 23, 24 formed in the rubber body 22. As is apparent from FIGS. 1–3, the first and second pockets 23, 24 and the annular metal member 26 divide the mass of the rubber body 22 into a radially inner portion and a radially outer portion.

As most clearly shown in FIG. 2, the orifice-defining annular metal member 26 has orifices in the form of a pair of fluid passages 32, 32 axially formed in diametrically opposite portions thereof such that the passages 32 communicate at their ends with the first and second pockets 23, 24. Namely, the opposite axial ends of the passages 32 are open in the bottoms of the annular pockets 23, 24.

A mounting plate 28 is fixedly mounted on the outer circumferential surface of the annular metal member 26. The plate 28 extends through the radially outer portion of the rubber body 22, and projects radially outwardly from the outer circumference of the rubber body 22. The plate 28 has two mounting holes 30 for receiving bolts, by which the plate 28 is fixed to the vehicle body 14 (FIG. 8). Thus, the strut bar 12 is elastically or flexibly connected to the vehicle body 14 by means of the instant fluid-filled strut bar cushion 16.

During vulcanization of the rubber body 22, metal rings 34 are secured to radially inner parts of the opposite axial end faces of the rubber body 22. These two metal rings 34 are located radially inward of the open ends of the first and second annular pockets 23, 24. The metal ring 34 disposed at the end of the rubber body 22 on the side of the first pocket 23 has an inside diameter smaller than the outside diameter of the inner sleeve 18, so that this metal ring 34 may be held in abutting contact with the corresponding end face of the inner sleeve 18. On the other hand, the metal ring 34 at the end of the rubber body 22 on the side of the second pocket 24 has an inside diameter substantially equal to the outside diameter of the inner sleeve 18, so that this metal ring 34 is fitted on the inner sleeve 18. A pair of annular calking metal members 38 are also secured to the opposite axial end faces of the rubber body 22, during vulcanization of the body 22. Each calking metal member 38 has an outer calking portion 36.

It follows from the above description that the rubber body 22, binding rings 25, orifice-defining annular metal member 26, mounting plate 28, metal rings 34 and calking metal members 38 constitute an intermediate assembly 42 as depicted in FIG. 3, which is prepared during vulcanization of the rubber body 22 in a suitable mold.

The inner sleeve 18 has an annular closure plate 44 fixed by fusion at its one axial end portion. The inner sleeve 18 with the closure plate 44 is inserted into the intermediate assembly 42 of FIG. 3, as shown in FIG. 1, in the direction from the second pocket 24 toward the first pocket 23. Then, the calking portion 36 of the calking metal member 38 on the side of the second pocket 24 is calked against the outer portion of the annular closure plate 44. Thus, the intermediate assembly 42 is secured to the inner sleeve 18 such that the closure plate 44 fluid-tightly closes the open end of the second pocket 24.

Subsequently, an annular closure member 48 having a central cylindrical portion 46 is positioned relative to the other end of the inner sleeve 18 on the side of the first pocket 23, such that the cylindrical portion 46 is press-fitted in the bore 20 of the inner sleeve 18 while the annular metal ring 34 is held between the closure member 48 and the corresponding end face of the inner sleeve 18. Further, the calking portion 36 of the corresponding calking metal member 38 is calked against the outer portion of the closure member 48, such that the open end of the first pocket 23 of the intermediate assembly 42 is fluid-tightly closed by the closure member 48.

With the openings of the first and second pockets 23, 24 fluid-tightly sealed by the closure member 48 and the closure plate 44, respectively, there are formed a first and a second fluid chamber 50, 52 which communicate with each other through the fluid passages or orifices 32 formed through the orifice-defining annular metal member 26.

As described above, the assembling procedure of the instant fluid-filled strut bar cushion 16 consists of the insertion of the inner sleeve 18 into the intermediate assembly 42, the press-fitting of the cylindrical portion 46 of the closure member 48 into the inner sleeve 18, and the calking of the calking metal members 38, 38 against the closure plate and member 44, 48. This assembling procedure is carried out within a mass of a suitable non-compressible fluid such as water and alkylene glycol, whereby the first and second fluid chambers 50, 52 are filled with the non-compressible fluid.

Figure 4:
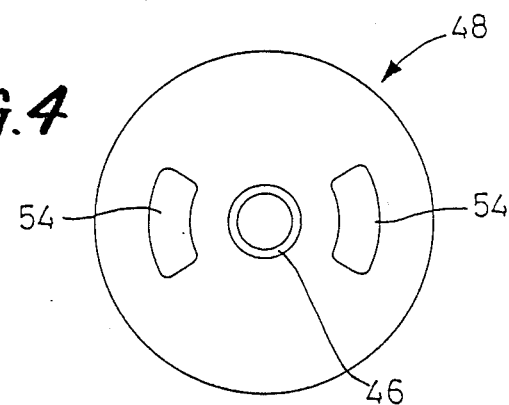
FIG. 4 is a plan view of a closure member of the strut bar cushion of FIG. 1.

The closure member 48 which closes the open end of the first pocket 23 has a pair of stopper rubber blocks 54, 54 secured to its inner surface, as illustrated in FIG. 4. With the closure member 48 positioned relative to the inner sleeve 18, the stopper rubber blocks 54 extend into the first pocket 23 or first fluid chamber 50.

Described more specifically, the stopper rubber blocks 54 are aligned with the first annular pocket 23 in the radial direction of the pocket 23, so that the free end of each block 54 is opposed to the end of the orifice-defining annular metal member 26 on the side of the first fluid chamber 50. In other words, the stopper rubber blocks 54 are positioned relative to the closure member 48 such that the free ends of the stopper rubber blocks 54 are aligned with the ends of the respective fluid passages 32 which are open at the bottom of the first pocket 23.

The axial length of the stopper rubber blocks 54 is determined such that the free end face of each block 54 is spaced apart from the corresponding end of the fluid passages 32 by a suitable distance in the axial direction of the annular metal member 26 when the instant strut bar cushion 16 is not installed on the vehicle. In a normal operating condition of the cushion 16, the end faces of the blocks 54 are spaced apart from the corresponding open ends of the fluid passages 32, thereby permitting the first and second fluid chambers 50, 52 to be held in communication with each other through the passages 32. As described below in detail, the stopper rubber blocks 54 are abuttable on the corresponding end face of the annular metal member 26, whereby the fluid passages 32 are closed to inhibit fluid communication between the two fluid chambers 50, 52.

When a vibrational load is applied to the thus constructed strut bar cushion 16 in its axial direction through the inner sleeve 18 and the mounting plate 28, a relative axial displacement occurs between the closure member 48 connected to the inner sleeve 18, and the orifice-defining annular metal member 26 connected to the mounting plate 28. As long as the amplitude of the vibrational load is smaller than a certain upper limit, the fluid is forced to flow between the first and second fluid chambers 50, 52 due to changes in the volumes of the chambers 50, 52 which are caused by elastic deformation of the rubber body 22. As a result, the input vibration is effectively damped due to the fluid flows through the passages 32, or based on resonance of masses of the fluid in the passages 32, as well as by the elastic deformation of the rubber body 22. If the amplitude of the vibrational load exceeds the upper limit, the free end faces of the stopper rubber blocks 54 abut on the corresponding end face of the annular metal member 26, thereby closing the passages 32 and inhibiting the fluid flows between the two fluid chambers 50, 52. In this condition, the strut bar cushion 16 exhibits comparatively hard or stiff spring characteristic due to an increased pressure in the first fluid chamber 50.

In the thus constructed strut bar cushion 16, the amount of elastic deformation or strain of the cushion is changed non-linearly in relation to the amplitude of the input vibrations. Since the abutting contact of the stopper rubber blocks 54 on the annular metal member 26 and the closure of the passages 24 prevent an excessive amount of elastic deformation of the rubber block 22 and result in the increased stiffness of the cushion 16 upon application of an excessively high vibrational load, the hardness of the rubber body 22 may be set to be relatively low. Therefore, it is possible to increase the amount of change in the volumes of the fluid chambers 50, 52 or the amount of flows of the fluid through the passages 32 while the cushion 16 is subjected to ordinary amplitude vibrations. Consequently, the vibration damping effect based on the fluid flows or resonance of the fluid masses can be significantly improved.

Thus, the instant fluid-filled elastic strut bar cushion 16 is reliable for a vibrational load having an extremely large amplitude, and at the same time capable of effectively damping harshness shocks which occur during running of the vehicle on a stepped road surface, owing to the fluid flows through the passages 32. Hence, the instant strut bar cushion 16 assures enhanced driving comfort of the vehicle.

Figure 5:
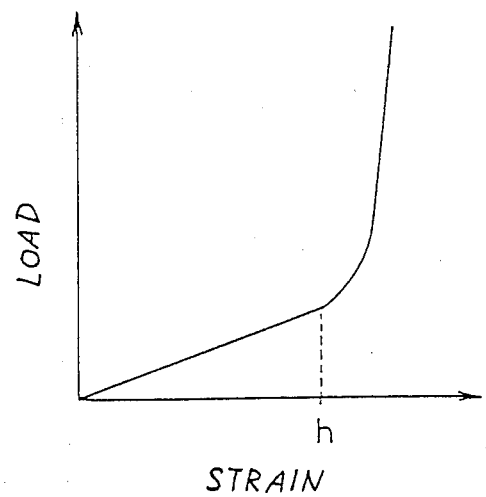
FIG. 5 is a graph indicating a load-strain curve of the strut bar cushion of FIG. 1.

As indicated in FIG. 5, the point at which the load-strain (deformation) relationship of the cushion 16 is changed is determined by a nominal distance "h" between the end faces of the stopper rubber blocks 54 and the end face of the annular metal member 26.

In the instant strut bar cushion 16, the binding rings 25 embedded in the rubber body 22 serve to limit the amount of radially outward elastic deformation of the radially outer portions of the body 22 which are positioned outwardly of the annular fluid chambers 50, 52. The binding rings 25 therefore serve to prevent a decrease in the pressure within the first fluid chamber 50, which would otherwise occur due to the radially outward expansion of the rubber body 22 while the passages 32 are closed by the stopper rubber blocks 54. This contributes to a non-linear load-strain curve of the cushion 16 (as indicated in FIG. 5 that is, stiffening of the cushion 16 upon application of an excessively large vibrational load.

Figure 6:
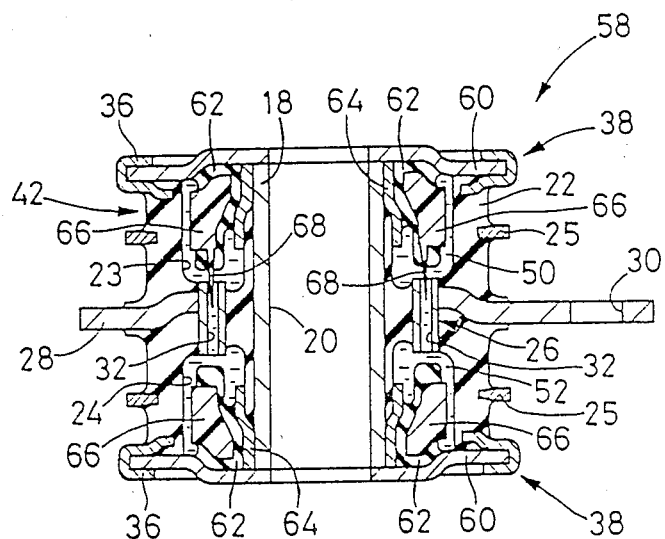
FIG. 6 is an elevational view in longitudinal cross section of another embodiment of the invention also in the form of a strut bar cushion.

Referring next to FIG. 6, a modified strut bar cushion according to another embodiment of the invention is indicated generally at 58. In FIG. 6, the same reference numerals as used in FIGS. 1-3 are used to identify the components similar to those used in the first embodiment. In the interest of simplification, no redundant description of these components will be provided.

The instant modified strut bar cushion 58 employs a pair of closure plates 60, 60 positioned at the opposite axial ends of the inner sleeve 18, for closing the open ends of the first and second annular pockets 23, 24. Each of these closure plates 60, 60 is provided with two stopper rubber blocks 62, 62 secured to its inner surface. The rubber blocks 62, which are accommodated in the fluid chambers 50, 52, are formed such that their free end faces are opposed to the corresponding ends of the respective fluid passages 32, 32, with a suitable spacing therebetween in the axial direction of the cushion 58. Reference numeral 64 denotes cylindrical mounting adaptors which are secured to the closure plates 60 and which are press-fitted on the axially end portions of the inner sleeve 18, in order to fix the closure plates 60 to the inner sleeve 18.

Each of the stopper rubber blocks 62 formed on the closure plates 60 has a stiff block 66 embedded therein. That is, the stiff block 66, which forms an integral part of the rubber block 62, has a higher hardness than the remainder of the rubber block 62, and serves to prevent buckling and local strain of the block 62 upon abutment of the block 62 against the orifice-defining annular metal member 26.

Figure 7:
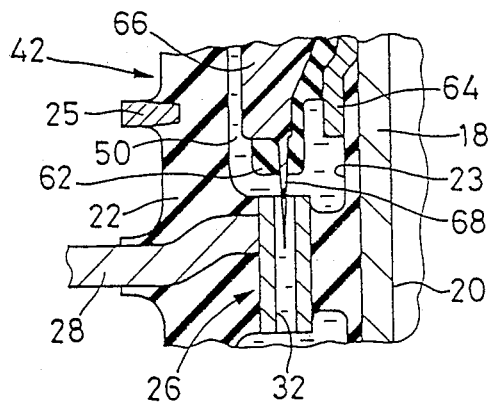
FIG. 7 is a fragmentary enlarged view showing a part of the strut bar cushion of FIG. 6.

As illustrated in FIG. 7, each of the stopper rubber blocks 62 formed on the closure plate 60 on the side of the first fluid chamber 50 is formed with an insert in the form of a projecting needle 68 integral with the stiff block or portion 66. The projecting needle 68 extends through the rubber block 62 and projects into the fluid chamber 50, in the axial direction of the cushion 58, and further into the end portion of the corresponding passage 32. The projecting needle 68 is tapered such that the diameter decreases in the direction toward the tip. The diameter of the needle 68 at its portion adjacent to the end face of the rubber block 62 is substantially the same as or slightly smaller than the inside diameter of the passage 32.

The instant strut bar cushion 58 is also capable of effectively damping vibrations applied thereto through the inner sleeve 18 and the mounting plate 28, based on the fluid flows through the passages 32 or resonance of the masses of the fluid in the passages 32. Further, the cushion 58 exhibits sufficiently stiff spring characteristic upon closure of the passages 32 by the stopper rubber blocks 62 when the input vibrational load exceeds a certain upper limit.

Further, the amount of a clearance between the outer surface of each projecting needle 68 and the inner surface of the corresponding passage 32, that is, the cross sectional area of the fluid flow at the appropriate end of the passage 32 is varied with a length of the portion of the needle 68 which is inserted in the end portion of the passage 32, namely, with a relative displacement between the inner sleeve 18 and the mounting plate 28, which is changed with the magnitude of the input vibrational load. More particularly, the cross sectional area of the fluid flow decreases as the length of the portion of the needle 68 within the passage 32 increases with the vibrational load.

Accordingly, the damping coefficient of the instant strut bar cushion 58 increases with the magnitude of the input vibrational load, and the cushion 58 is accordingly stiffened, before the stopper rubber blocks 62 are brought into abutting contact with the orifice-defining annular metal member 26. Thus, the needles 68 avoid a sudden change in the spring characteristic of the cushion 58 upon abutment of the stopper rubber blocks 62 on the annular metal member 26, thereby reducing or eliminating shocks which would otherwise occur due to such a sudden change in the spring characteristic.

Further, the stiff block 66 embedded in each rubber block 62 effectively improves the durability of the rubber block 62, eliminating the buckling and local strain of the block 62.

In the instant modified strut bar cushion 58, the vibration damping characteristic can be readily changed by adjusting the taper angle and/or effective length of the projecting needles 68.

While the present invention has been described in its presently preferred embodiments, for illustrative purpose only, it is to be understood that the invention is not limited to the details of the illustrated embodiment, but various changes, modifications and improvement may be made in the invention.

For example, each of the first and second annular pockets 23, 24 or fluid chambers 50, 52 formed in the axially end portions of the rubber body 22 in the illustrated embodiments may be replaced by a plurality of pockets or fluid chambers which are arranged in the circumferential direction of the rubber body 22.

Further, the two stopper rubber blocks 54 (62) which are positioned opposite to each other diametrically of the orifice-defining annular metal member 26 for closing the respective passages 32 may be replaced by a single annular rubber block aligned with the annular metal member 26.

As indicated above, the two rubber blocks 54 (62) are arranged symmetrically with each other with respect to the inner sleeve 18, the symmetrical relationship of the rubber blocks is not essential, since the rubber blocks 54 (62) do not directly receive the axial load. Further, if a single fluid passage 32 is provided as an orifice, the passage 32 may be closed by a single rubber block.

While the illustrated embodiments use the single annular member 26 as the orifice-defining member, the annular metal member 26 may be replaced by a plurality of members arranged in the circumferential direction of the cylindrical rubber block 22. Moreover, the orifice-defining member or members may have a circumferentially formed orifice or orifices.

The binding rings 25 used in the illustrated embodiments are not essential to practice the principle of the invention, but are practically desirable, the spring characteristic of the cushion 16, 58 may be easily modified by suitably determining the number, configuration and location of the rings 25.

While the projecting needles 68 are tapered over their entire length, only the free end portion or other portion of the needles 68 may be tapered. Alternatively, the inner surface of the passages 32 may be tapered. In any case, the needles 68 and the end portions of the passages 32 must be formed so that the cross sectional area of the fluid flow at the end portions of the passages 32 may be changed as the length of the portion of the needles 68 within the passages 32 is changed.

Although the illustrated embodiments of the present invention are adapted to be used as a strut bar cushion for a motor vehicle, the fluid-filled elastic cushioning device of the invention may be utilized for other purposes and applications.

It is to be understood that the invention may be embodied with various other changes, modifications and improvements, which may occur to those skilled in the art, without departing from the spirit and scope of the invention defined in the following claims.

What is claimed is:

1. A fluid-filled elastic cushioning device for elastically connecting a first and a second member, comprising:
   an inner sleeve through which the first member is fixedly inserted;
   an elastic body fitted on an outer circumferential surface of said inner sleeve and having a first and a second pocket which are spaced apart from each other in an axial direction of the inner sleeve and which are open in opposite axial end faces of the elastic body;
   a first and a second closure member for fluid-tightly closing the open ends of said first and second pockets to thereby form a first and a second fluid chamber filled with a non-compressible fluid;
   an orifice-defining member embedded in said elastic body and having an orifice which communicates with said first and second fluid chambers;
   a mounting plate secured to an outer circumferential surface of said orifice-defining member such that the mounting plate extends through an axially intermediate portion of said elastic body in a radial direction of the inner sleeve;
   at least one of opposite ends of said orifice which communicate with said first and second fluid chambers being open at a bottom of the corresponding at least one of said first and second pockets; and
   at least one stopper rubber block being secured to each of at least one of said first and second closure members which closes said corresponding at least one of the first and second pockets, said at least one rubber block extending into the corresponding one of said first and second fluid chambers such that a free end of each of said at least one stopper rubber block is normally spaced apart by a predetermined distance from the corresponding open end of said orifice, said each stopper rubber block being abuttable at the free end thereof on the corresponding end of said orifice-defining member, to thereby close said orifice at the corresponding open end, when said cushioning device is subjected to a vibrational load exceeding a predetermined upper limit.

2. A fluid-filled elastic cushioning device according to claim 1, wherein at least one of said at least one rubber block is formed with at least one insert which extends from said free end, so as to move in opposite directions in an end portion of said orifice through said corresponding open end of said orifice as the cushioning device is subjected to the vibrational load, one of an outer surface of each of said at least one insert and an inner surface of said end portion of said orifice being tapered such that an amount of a clearance between said outer surface of said each insert and said inner surface of said end portion of the orifice is varied as said each insert is moved in said end portion of the orifice 3. A fluid-filled elastic cushioning device according to claim 2, wherein said each stopper rubber block has an internally positioned stiff portion, said stiff portion having a higher hardness than the remainder of said each stopper rubber block.

4. A fluid-filled elastic cushioning device according to claim 3, wherein said each insert is formed as an integral part of said stiff block such that said each insert extends from said stiff portion into said end portion of said orifice, through said remainder of the rubber block.

5. A fluid-filled elastic cushioning device according to claim 1, wherein said orifice-defining member consists of an annular member which has two fluid passages formed in an axial direction thereof, said two fluid passages being spaced apart from each other in a circumferential direction of said annular member, said at least one stopper rubber block consisting of two rubber blocks which are abuttable on the open ends of said two fluid passages, respectively.

6. A fluid-filled elastic cushioning device according to claim 1, wherein said opposite ends of said orifice are open in the bottoms of said first and second pockets, respectively, said at least one stopper rubber block being disposed in one of said first and second fluid chambers.

7. A fluid-filled elastic cushioning device according to claim 1, wherein said opposite ends of said orifice are open in the bottoms of said first and second pockets, respectively, said at least one stopper rubber block being disposed in both of said first and second fluid chambers.

8. A fluid-filled elastic cushioning device according to claim 1, further comprising at least one binding ring associated with said elastic body, for limiting an amount of elastic deformation of said elastic body in a radially outward direction of said inner sleeve.

9. A fluid-filled elastic cushioning device according to claim 1, wherein said first and second fluid chambers consist of a pair of annular chambers which normally communicate with each other through said orifice formed in said orifice-defining member embedded in an axially middle portion of said elastic body.

10. A fluid-filled elastic cushioning device according to claim 1, wherein said first member is a strut bar of connected to a suspension arm of a motor vehicle, while said second member is a body of said vehicle.

* * * * *